(12) United States Patent
Viinikanoja (10) Patent No.: US 6,936,809 B2
(45) Date of Patent: Aug. 30, 2005

(54) METHOD AND DEVICE FOR LATERAL ADJUSTMENT OF IMAGE

(75) Inventor: Jarkko Viinikanoja, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/803,794

(22) Filed: Mar. 17, 2004

(65) Prior Publication Data

US 2004/0227063 A1 Nov. 18, 2004

Related U.S. Application Data

(60) Provisional application No. 60/455,151, filed on Mar. 17, 2003.

(51) Int. Cl.[7] .............................. H01J 40/14; H01J 3/14; H01J 5/16
(52) U.S. Cl. ...................... 250/216; 250/201.1; 359/666
(58) Field of Search ........................... 250/201.1, 201.2, 250/216; 359/666

(56) References Cited

U.S. PATENT DOCUMENTS 4,802,746 A * 2/1989 Baba et al. ................. 359/667
6,369,954 B1 * 4/2002 Berge et al. ................ 359/666

FOREIGN PATENT DOCUMENTS

| EP | 1 069 450 A2 | 1/2001 |
|---|---|---|
| EP | 1 271 218 A1 | 1/2003 |
| WO | WO 03/069380 | 8/2003 |

* cited by examiner

Primary Examiner—Stephone B. Allen
Assistant Examiner—Patrick J. Lee
(74) Attorney, Agent, or Firm—Ware, Fressola, Van Der Sluys & Adolphson LLP (57) ABSTRACT

A liquid lens, according to the electrowetting principle, is used in an imaging system to affect the optical axis of the imaging system. In particular, a seal compartment having a first side and an opposing second side is used to dispose a liquid lens on the first side. A plurality of electrode areas are disposed adjacent to the first side and a common electrode is disposed adjacent to the second side. In order to compensate for undesirable image shifting due to hand motion, different voltage levels are applied to the plurality of electrode areas so that the electric field applied on the liquid lens is non-uniform, causing deformation of the liquid lens. The voltage levels are determined such that the shift in the optical axis due to the deformation of the liquid lens substantially cancels out the motion-induced image shift.

16 Claims, 7 Drawing Sheets

METHOD AND DEVICE FOR LATERAL ADJUSTMENT OF IMAGE

This patent application is based on and claims priority to U.S. Provisional Patent Application Ser. No. 60/455,151, filed Mar. 17, 2003.

CROSS REFERENCE TO RELATED APPLICATIONS

This patent application is related to U.S. patent application Ser. No. 10/803,545, assigned to the assignee of the instant application, and filed even date herewith.

FIELD OF THE INVENTION

The present invention relates generally to an optical component for forming an image in an imaging device and, more specifically, to the stabilization of the image, which is caused to shift laterally on the image plane by hand motion or other vibrations.

BACKGROUND OF THE INVENTION

Figure 1:
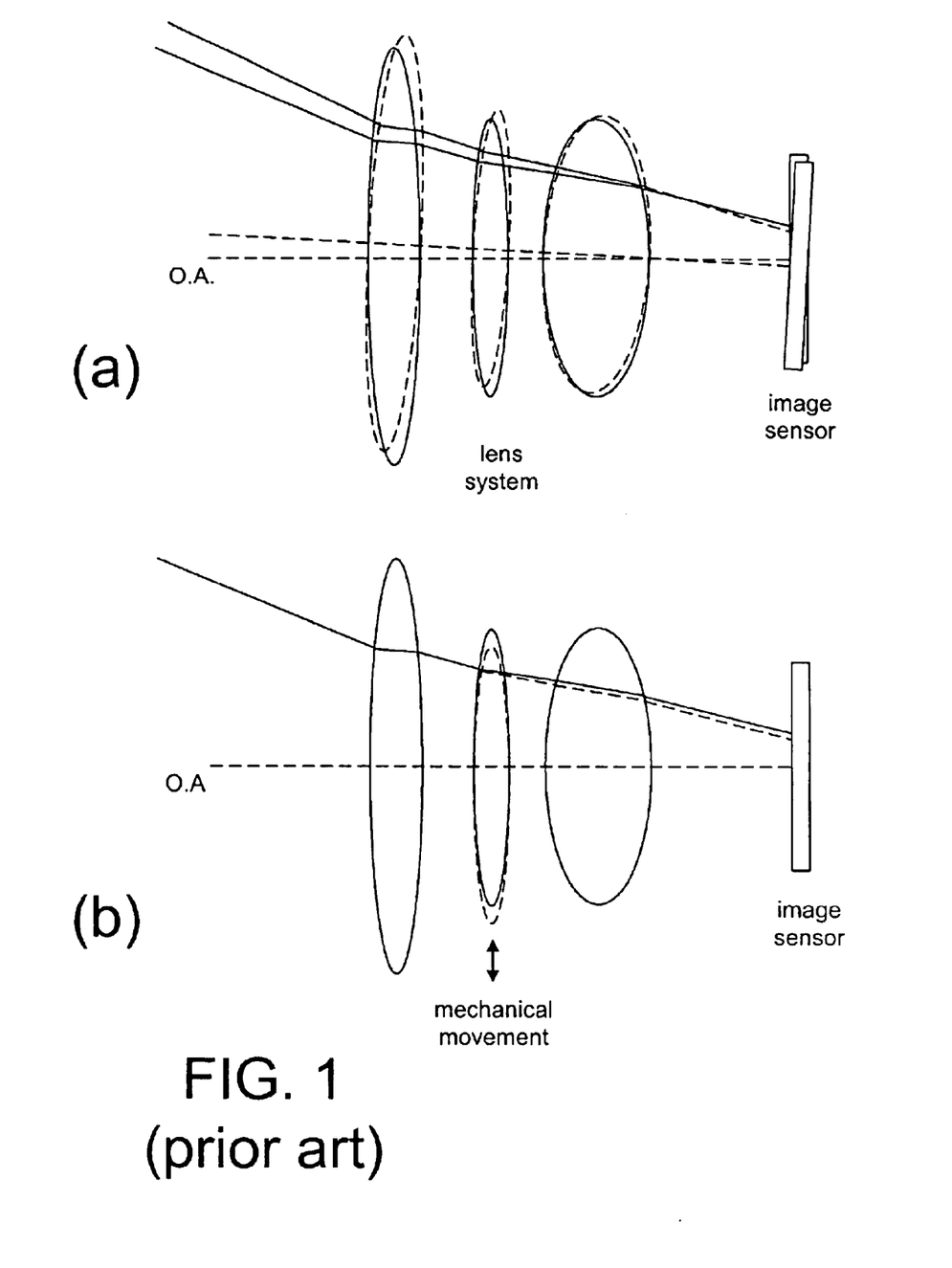
FIG. 1a is a schematic representation illustrating an image can be blurred by hand motion.
FIG. 1b is a schematic representation illustrating mechanical movement of an optical component is used to compensate the image shifting due to hand motion.

When taking a still image, a series of still images or video images using an imaging device, such as a camera, a camcorder, a video recorder, a mobile phone or the like, the user's hand may shake, causing the image formed on the image plane to shift laterally. The shift could blur the image. The shift can be caused by the tilting of the camera, or the lateral movement of the camera. FIG. 1 a shows the tilting of the camera due to the hand motion. As shown, the images of different parts of the scenery are formed on the same part of the image sensor. If the tilting angle is small, the shift is more or less equivalent to that caused by a lateral movement of the camera.

Figure 2:
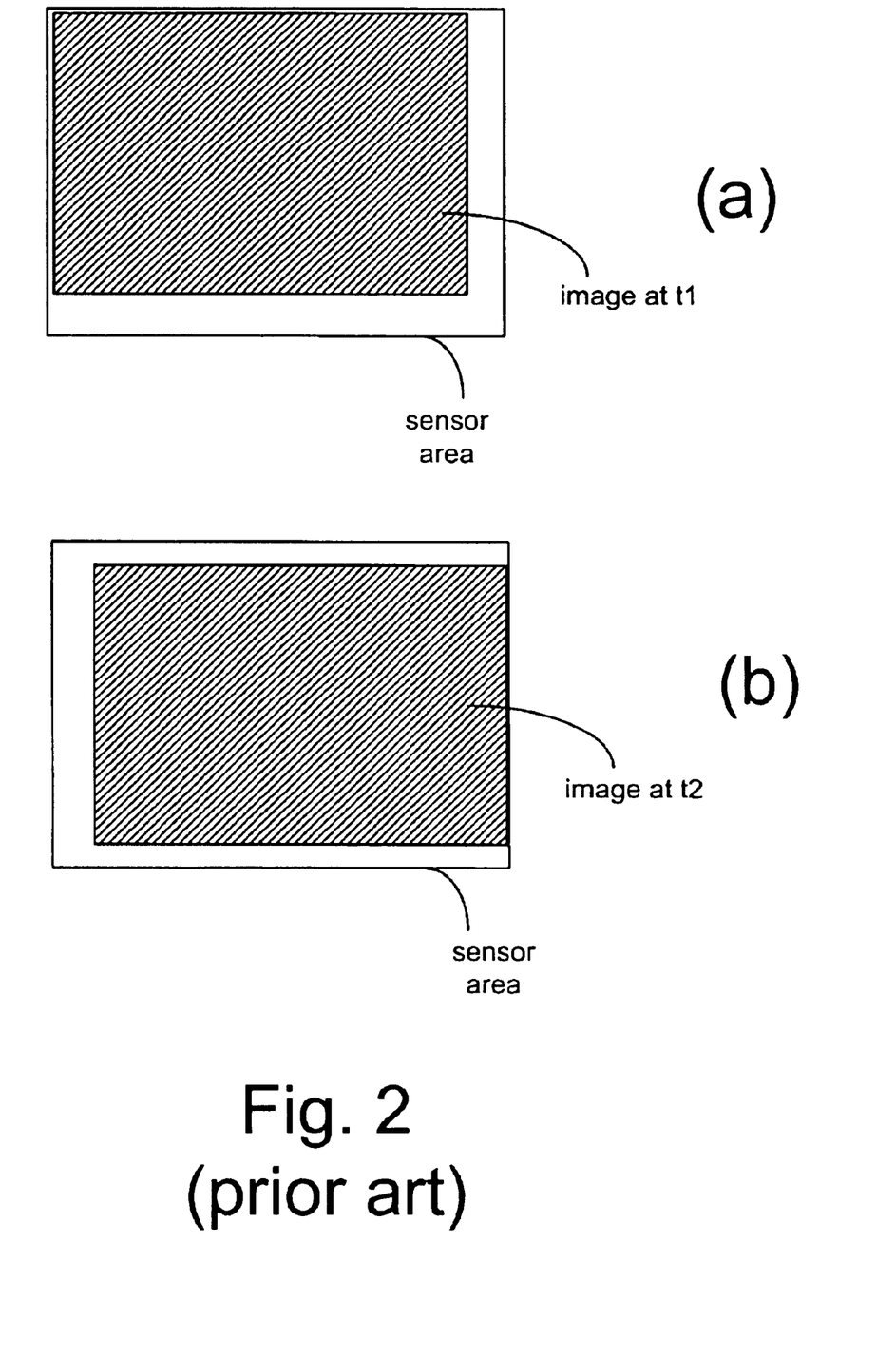
FIG. 2 is a schematic representation illustrating a large image sensor being used for image shifting on the image plane.

It is advantageous and desirable to stabilize the image in order to improve the viewing quality. Typical stabilization methods in the prior art can be divided into two types: one is based on software and one is based on a special optical device. The software method is applicable when the camera uses a solid-state imaging device such as CCD or CMOS for image formation. With the software method, the size of the CCD or CMOS imager must be larger than the size of the actual image for viewing or for recording so that the image can be effectively shifted using a real-time image processing technique to collectively move the pixel coordinates from one location to another. The software method is illustrated in FIGS. 2a and 2b, which show the same image is formed on a different part of the image sensor at different times due to hand motion.

With the other image stabilization method, it requires that at least one optical component of the imaging lens system be mechanically shifted in the x-y direction, as shown in FIG. 1b. The mechanical movement of the lens component involves complex and expensive mechanical structures.

In a mobile phone with limited image capability, the prior art method for image stabilization using software is impractical because a mobile phone in general is limited in its memory and image processing power. A mechanical structure is also undesirable because it is costly and requires space for implementation.

It is advantageous and desirable to provide a method and device for image stabilization without using a large image sensor or a movement mechanism to move the optical components in an imaging device.

SUMMARY OF THE INVENTION

The present invention uses electrowetting (EW) technology to shift laterally an image formed on an image plane. Accordingly, the present invention uses a liquid droplet as a lens and uses an electric field to change the shape of the liquid droplet for image shifting.

The first aspect of the present invention is a method for stabilizing an image formed in an imaging device, wherein the image can be caused to shift in a plane by movement of the imaging device, said method comprising the steps of:

providing a deformable lens in the imaging device, said deformation lens having an optical axis, the optical axis at least partially determining a location of the formed image in the imaging device, and applying an electric field on the deformable lens for causing a change in the optical axis so as to compensate for the shifting of the image in the plane caused by the movement of the imaging device.

According to the present invention, the electric field is achieved by two electrode layers, said method further comprising the step of:

sectioning at least one of the electrode layers into a plurality of electrode areas so as to allow a voltage applied to one of said electrode areas to be different from a voltage applied to at least another one of said electrode areas.

According to the present invention, the deformable lens comprises a liquid droplet disposed on a substrate adjacent to one of the electrode layers, such that the contact angle of the liquid droplet with substrate is caused to change be the electric field.

According the present invention, the method further comprises the steps of:

computing the image shift in the plane; and determining the applied electric field based on the image shift.

The second aspect of the present invention provides an optical component for use in an imaging device for shifting an image formed on a plane of the imaging device, the optical component having an optical axis at least partially determining a location of the formed image in the imaging device, said optical component comprising:

a compartment having:

a first side and an opposing second side;

a substrate on the first side;

a deformable lens comprising a droplet of a first liquid having a first refractive index disposed along the optical axis on the substrate; and a second liquid disposed in contact with the droplet, the second liquid having a second refractive index different from the first refractive index;

a first electrode layer disposed adjacent the first side of the compartment; and a second electrode layer, disposed in a cooperative relation with the first electrode layer, for providing an electric field on the deformable lens when a voltage is applied to at least the first electrode layer, wherein the first electrode layer is effectively divided into a plurality of electrode areas to receive the voltage so that the electric field on the deformable lens can cause a change in the optical axis.

According to the present invention, the second electrode layer is disposed adjacent to the second side of the compartment.

The third aspect of the present invention provides an imaging device having an optical axis and an image plane for forming an image on the image plane at a location at least partially determined by the optical axis, said imaging device comprising:

a voltage source; and
an optical compartment having:
  a first side and an opposing second side;
  a substrate on the first side;
  a deformable lens comprising a droplet of a first liquid having a first refractive index disposed along the optical axis on the substrate; and
  a second liquid disposed in contact with the droplet, the second liquid having a second refractive index different from the first refractive index;
a first electrode layer disposed adjacent to the first side of the compartment, the first electrode layer operatively connected to the voltage source; and
a second electrode layer, disposed in a cooperative relation with the first electrode layer, for providing an electric field on the deformable lens when a voltage is applied to at least the first electrode layer, wherein the first electrode layer is effectively divided into a plurality of electrode areas to receive the voltage so that the electric field on the deformable lens can cause a change in the optical axis.

The fourth aspect of the present invention provides a portable device, which comprises:
  a voltage source;
  an imaging sensor array; and
  an image forming module having an optical axis and an image plane substantially on the imaging sensor array for forming an image on the imaging sensor array at a location at least partially determined by the optical axis, said image forming module comprising:
    an optical component comprising:
      a first electrode layer operatively connected to the voltage source;
      a deformable lens disposed along the optical axis adjacent to the first electrode layer; and
    a second electrode layer, disposed in a cooperative relation with the first electrode layer, for applying an electric field on the deformable lens, wherein the first electrode layer is effectively divided into a plurality of electrode areas so that the electric field applied on the deformable lens can cause a change in the optical axis.

According to the present invention, the portable device further comprises:
  an image processor, operatively connected to the imaging sensor array for receiving signals indicative of the image formed on the imaging sensor array, for determining a shift of the image location due to movement of the portable device, wherein the image processor is also operatively connected to the voltage source for providing a signal indicative of the image shifting to the voltage source so as to allow the voltage source to adjust the electric field such that the optical axis is changed to compensate for the image shifting due to the movement.

According to the present invention, the image processor comprises a software program for computing voltage levels on the electrode areas so as to allow the voltage source to adjust the electric field based on the voltage levels, and the software program comprises a code for determining a shift of the image location based on the signals received from the imaging sensor array.

The portable device comprises a mobile terminal or the like.

According to the present invention, the deformable lens comprises a droplet of a first liquid having a first refractive index, and wherein the optical component further comprises an optical compartment, the compartment having:
  a first side and an opposing second side, the first side adjacent to the first electrode layer;
  a substrate on the first side for disposing the deformable lens; and
  a second liquid disposed in contact with the droplet, the second liquid having a second refractive index different from the first refractive index.

The fifth aspect of the present invention provides a software product for use in an imaging device, the imaging device having an optical axis and an image plane for forming an image on the image plane at a location at least partially determined by the optical axis, the imaging device comprising:
  a voltage source; and
  an optical component comprising:
    a first electrode layer operatively connected to the voltage source;
    a deformable lens disposed along the optical axis adjacent to the first electrode layer; and
    a second electrode layer, disposed in a cooperative relation with the first electrode layer, for applying an electric field on the deformable lens, wherein the first electrode layer is effectively divided into a plurality of electrode areas so that the electric field applied on the deformable lens can cause a change in the optical axis.

The software product comprising:
  a code for determining a motion-induced image shift on the image plane; and
  a code for determining a plurality of voltage levels based on the image shift for providing a signal indicative of the voltage levels to the voltage source so as to allow the voltage source to provide the voltage levels to the plurality of electrode areas for causing the change in the optical axis in order to compensate for the motion-induced image shift.

The present invention will become apparent upon reading the description taken in conjunction with FIGS. 3 to 10.

DETAILED DESCRIPTION OF THE INVENTION

The present invention uses a liquid lens for image shifting. A voltage control system is used to deform the liquid lens in an asymmetrical way. The present invention uses electrowetting (EW) technology to provide the required liquid lens. In EW technology, a droplet of liquid is placed on a substrate to function as a lens. The contact angle of the droplet is usually a function of the surface tension of the liquid under the influence of the surface properties of the substrate. When an electric field is applied to the liquid droplet, the electric field modifies the surface tension at the liquid-solid interface, causing a change in the contact angle (see FIG. 3, contact angle is changed from θ to θ'). The change in the contact angle causes a change in the surface curvature of the droplet.

EW technology is known in the art. Kroupenkine et al. (EP 1 271 218 A1) discloses disposing a liquid droplet on a substrate as a liquid lens having a focal length and applying a voltage on the liquid droplet in order to change the focal length. Kroupenkine et al. also discloses having a plurality of electrodes adjacent to the liquid droplet and applying different voltage potentials on the electrodes so as to move the liquid droplet from one location of the substrate to another. Kroupenkine et al. describes how the contact angle is changed in terms of applied voltage. Berge et al. U.S. Pat. No. 6,369,954 B1) discloses having a chamber filled with a first liquid and a drop of second liquid, and applying a voltage on the electrodes surrounding the chamber so as to change the focal length of the liquid drop. Onuki et al. (EP 1 069 450 A2) also discloses having a chamber filled with a first liquid and a drop of second liquid, and applying a voltage so as to change the focal length. Onuki et al. additionally discloses that the height of the chamber is limited so as to change the focusing properties of the liquid drop when the applied voltage exceeds a value. Feenstra et al. (WO 03/069380 A1) discloses having a cylindrical compartment filled with a first fluid and a second fluid, wherein the fluid contact layer of both the first and the second fluids has a cylindrical inner wall.

Figure 3:
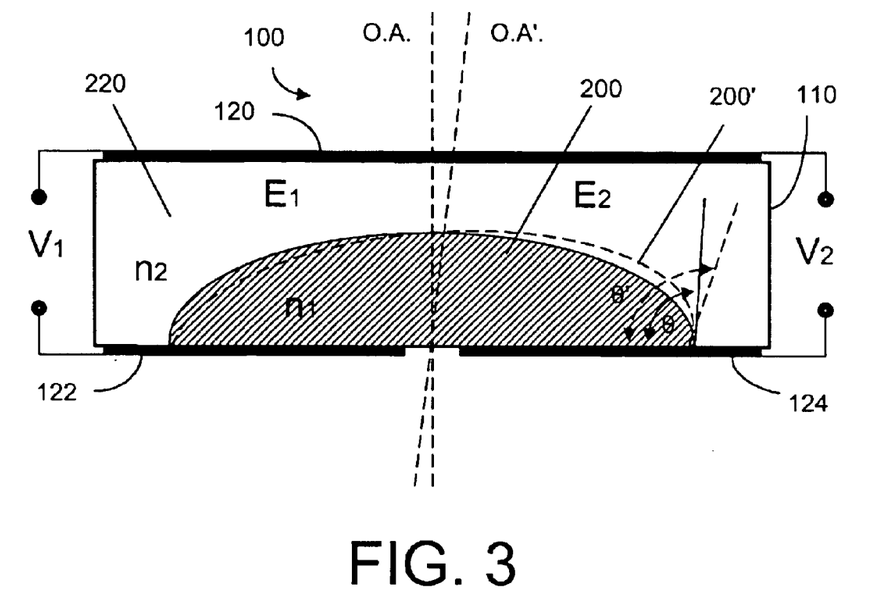
FIG. 3 is a cross sectional view illustrating a liquid lens, according to the present invention, and the effect of lens deformation.

As previously mentioned, the key feature of the present invention is that the deformation on a deformable lens is asymmetrical relative to the optical axis of the lens. In order to achieve an asymmetric deformation on the liquid lens, an asymmetrical electric field is applied on the liquid droplet. The lens system 100 of the present invention is shown in FIG. 3. As shown, a liquid droplet 200 is placed on a substrate to function as the deformable lens. The substrate is part of a sealed chamber 110, which is filled with a different liquid 220. The refractive indices of the liquid lens 200 and the liquid 220 are $n_1$ and $n_2$, with $n_1 > n_2$ so that the droplet functions as a positive lens. For illustrative purposes, the asymmetrical electric field is denoted by $E_1$ and $E_2$ on different sides of the optical axis (O.A.). The electric field can be achieved by three electrodes 120, 122 and 124. It is understood that these electrodes are sufficiently transparent so that the lens system 100 can be used for imaging purposes. As shown in FIG. 3, the electrode 120 and the electrode 122 are operatively connected to a first voltage source $V_1$, and the electrode 120 and the electrode 124 are operatively connected to the voltage source $V_2$. If the resulting electric fields $E_1$ and $E_2$ are not equal, then the surface curvature on one part of the liquid droplet is different from the surface curvature on the other part of the liquid droplet. As a result, the optical axis of the liquid droplet may shift from O.A. to O.A'. If the lens system 100 is used in an imaging system (see FIG. 5, for example), then the image formed by the imaging system is caused to shift accordingly. For illustrative purposes, the resulting image shift can be treated as if the liquid droplet 200 is moved laterally, as shown in FIG. 4.

Figure 4:
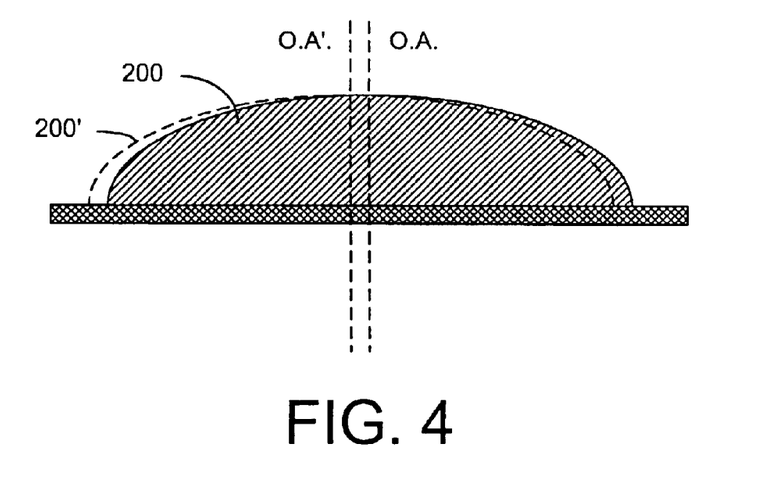
FIG. 4 is a cross sectional view illustrating the equivalent effect in image shifting due to lens deformation.
Figure 5:
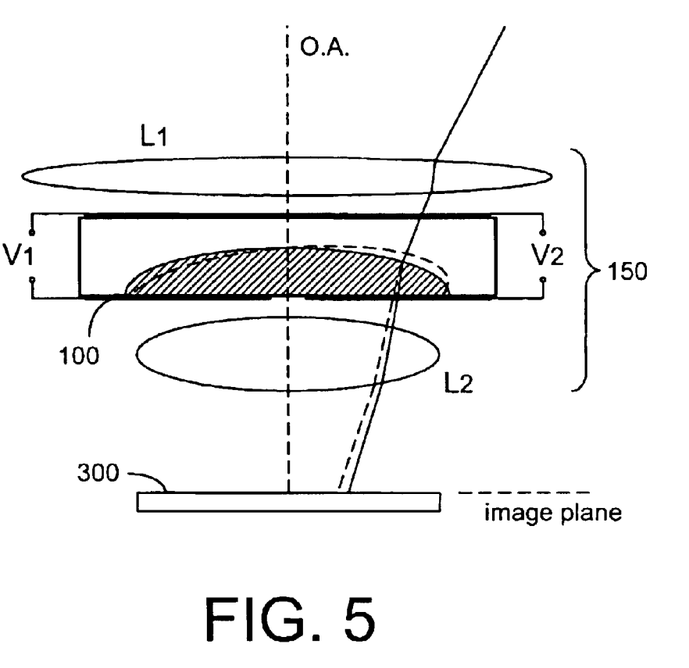
FIG. 5 is a schematic representation illustrating the implementation of a liquid lens in an imaging device.

The liquid lens 200, as depicted in FIGS. 3 and 4, can be used as the only element of the imaging optics, but it can also be one of a plurality of components in the imaging optics. For example, the lens system 100 can be used together with lens $L_1$ and lens $L_2$ to form an optical system 150, as shown in FIG. 5. The optical system 150 can be used to form an image on the imaging sensor array 300, which is located on the image plane (an x, y plane, see FIG. 6) of the optical system 150. In principle, the optical system 150 is equivalent to the lens system as shown in FIG. 1b.

Figure 6:
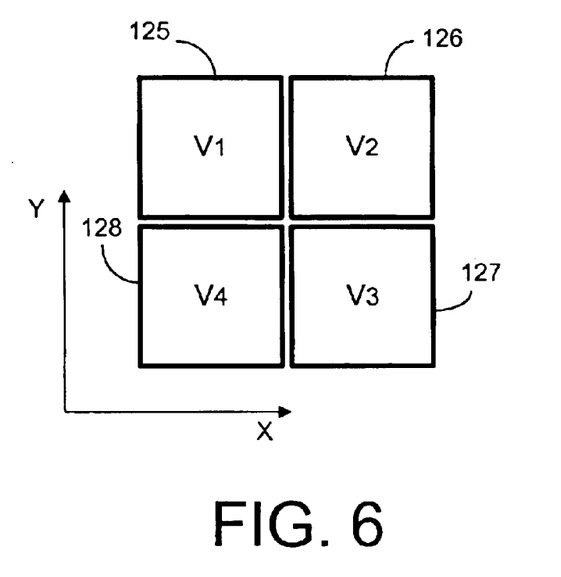
FIG. 6 is a schematic representation illustrating one way of sectioning an electrode.
Figure 7:
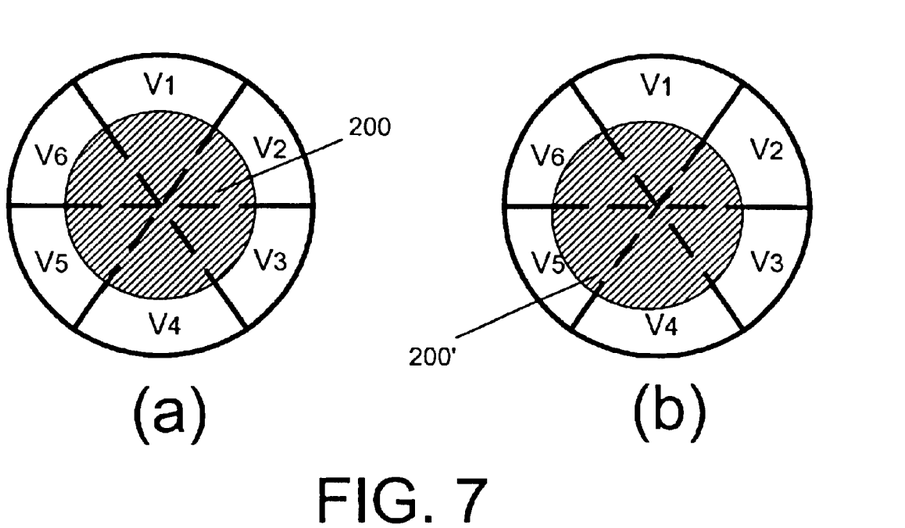
FIG. 7 is a schematic representation illustrating another way of sectioning the electrode.
Figure 8:
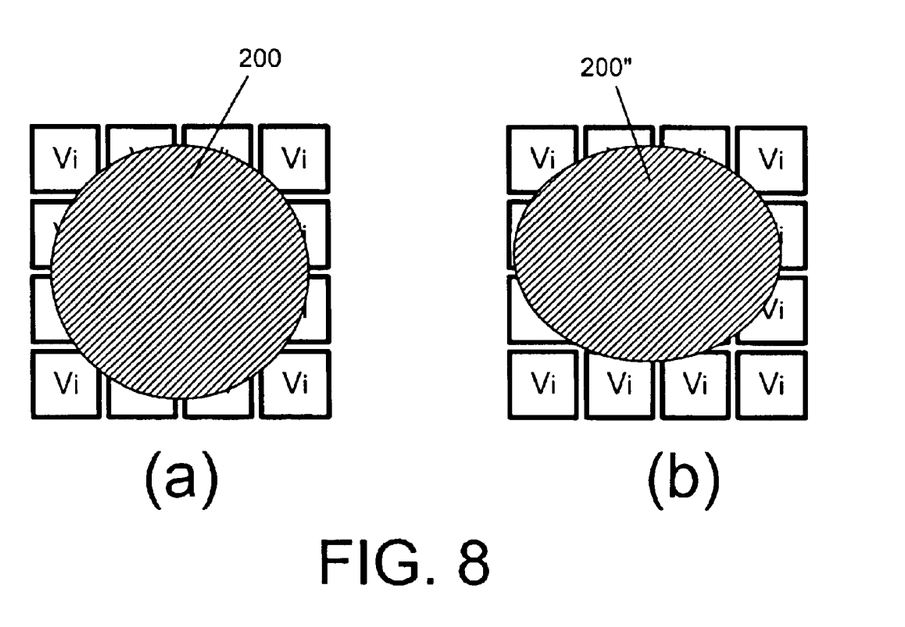
FIG. 8 is a schematic representation illustrating yet another way of sectioning the electrode.

In order to compensate for the image shift in both x and y directions in the x, y plane, it is desirable to have at least four electrodes 125, 126, 127 and 128, as shown in FIG. 6, operatively connected to potentials $V_1$, $V_2$, $V_3$ and $V_4$, (relative to a common electrode 120 in FIG. 3, for example). To allow for a finer control of the shift in the optical axis, it is possible to arrange a larger number of electrodes connected to potentials $V_1, \ldots, V_6$, as shown in FIG. 7. As shown in FIG. 7, the electrodes are arranged like pie sections in a circular pattern. Similarly, a large number of electrodes can be arranged in a rectangular array as shown in FIG. 8.

Figure 9:
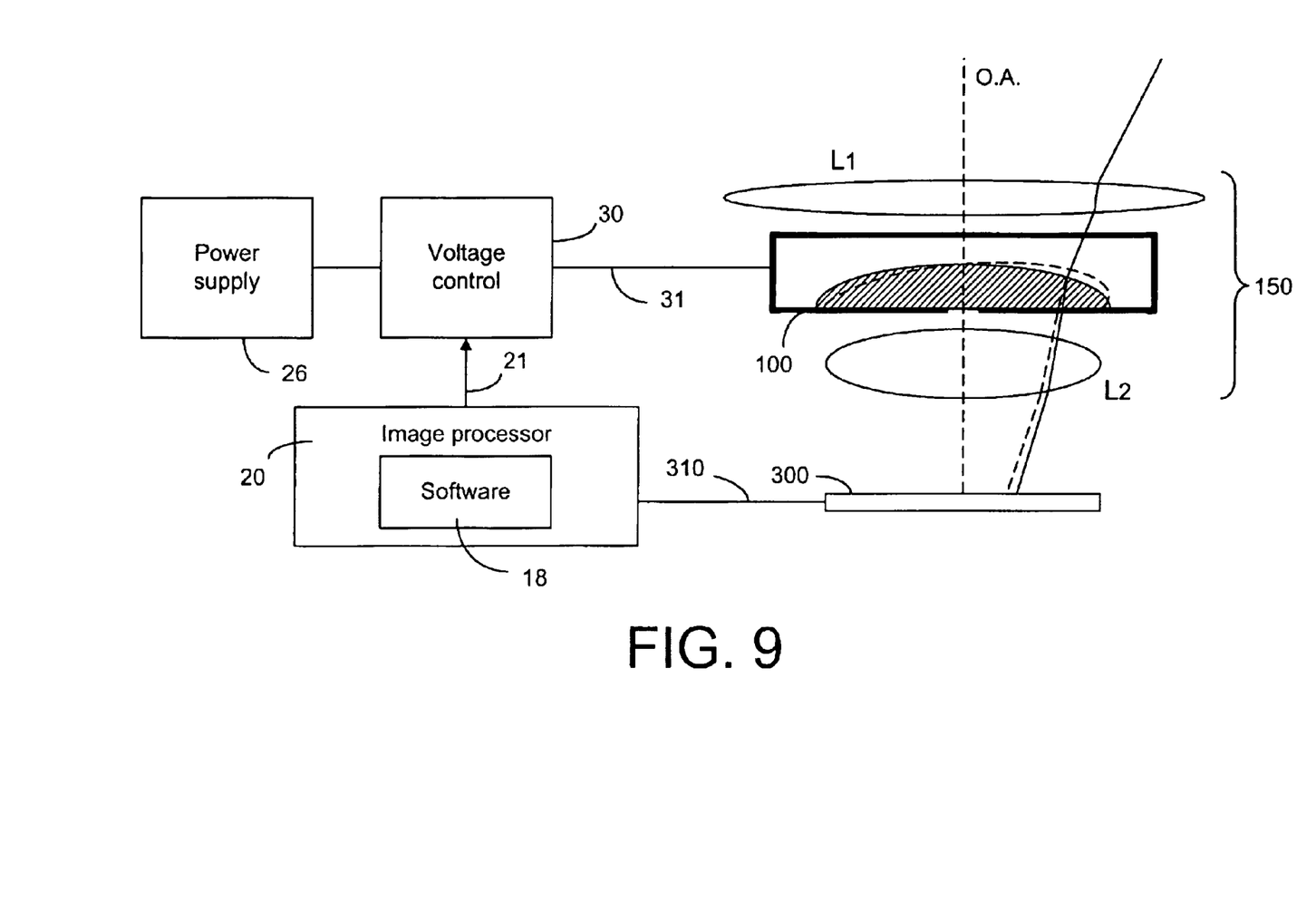
FIG. 9 is a schematic representation illustrating an image stabilization method, according to the present invention.

In order to carry out the invention, it is advantageous to use an imaging processing unit to monitor the amount of shifts in the x, y directions, for example. As shown in FIG. 9, the image processing unit 20 is operatively connected to the solid-state imaging array 300 to receive signals 310 indicative of the image formed on the solid-state imaging array 300. Based on the signals, the image processing unit 20 measures the shift amount ($\Delta x$, $\Delta y$) due to movement or jitter of the imaging system. A software program 18 is used to compute the appropriate voltages for different electrodes in the lens system 100 based on the shift amount ($\Delta x$, $\Delta y$) of the image on the image plane. The image processing unit 20 is also operatively connected to a voltage control module 30 and provides a signal 21 indicative of the appropriate voltages to the voltage control module 30. The voltage control module 30 applies different voltages 31 to the electrodes in order to cause the deformation of the liquid lens so as to compensate for the vibration-induced image jitter. The software program may include a code for computing the shift amount ($\Delta x$, $\Delta y$).

Figure 10:
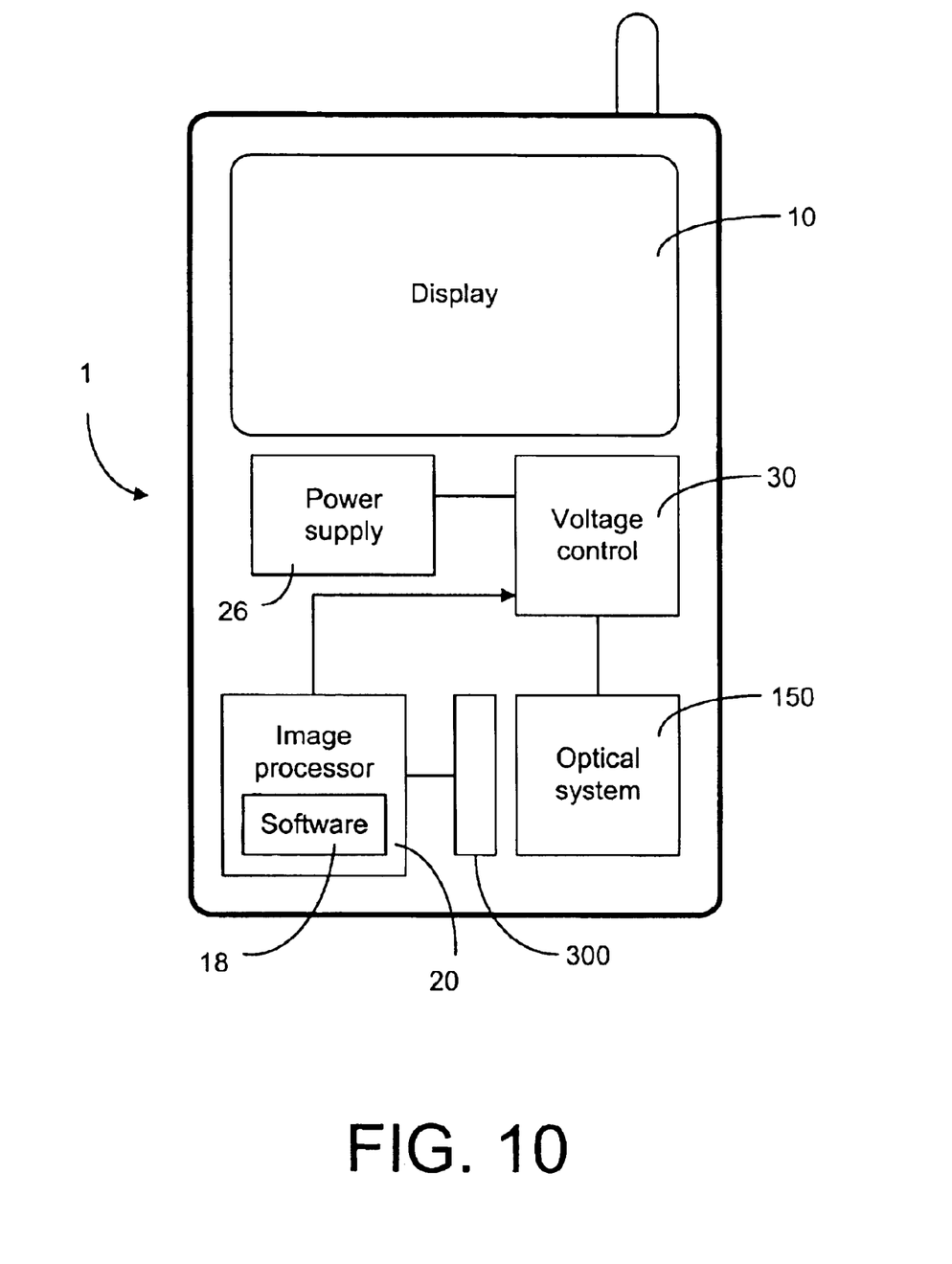
FIG. 10 is a schematic representation illustrating a portable device that uses the image stabilization method, according to the present invention.

The image stabilizer, according to the present invention, can be implemented in a small imaging device, such as a mobile phone, or a camcorder or other hand-held imaging devices. Because of the simplicity of the stabilizer, it can be used in rough conditions. As shown in FIG. 10, the optical system 150, according to the present invention, is implement in a portable device 1 for imaging purposes. The device 1 further comprises an imaging sensor array 300 for image acquisition. A power supply 20 and a voltage control module 30 are used to cause the non-uniform deformation of lens system 100 (see FIG. 9). It is advantageous to have a display 10 so as to allow a user to see the image formed on the imaging sensor array 300.

It should be noted that the drawing figures as shown in FIGS. 3 to 10 are for illustrative purposes only. For example, the shape of the electrodes and their arrangement can be different from those shown in FIGS. 6 to 8. The electrodes can be triangular or hexagonal, for example, so they can be arranged differently. Furthermore, the electrode areas can be equal or non-equal to each other.

Thus, although the invention has been described with respect to one or more embodiments thereof, it will be understood by those skilled in the art that the foregoing and various other changes, omissions and deviations in the form and detail thereof may be made without departing from the scope of this invention.

What is claimed is:

1. A method for stabilizing an image formed in an imaging device, wherein the image can be caused to shift in a plane by movement of the imaging device, said method comprising:

providing a deformable lens in the imaging device, said deformation lens having an optical axis, the optical axis at least partially determining a location of the formed image in the imaging device, and applying an electric field on the deformable lens for causing a change in the optical axis so as to compensate for the shifting of the image in the plane caused by the movement of the imaging device.

2. The method of claim 1, wherein the electric field is achieved by two electrode layers, said method further comprising:

sectioning at least one of the electrode layers into a plurality of electrode areas so as to allow a voltage applied to one of said electrode areas to be different from a voltage applied to at least another one of said electrode areas.

3. The method of claim 2, wherein the deformable lens comprises a liquid droplet disposed on a substrate adjacent to one of the electrode layers, such that the contact angle of the liquid droplet with substrate is caused to change be the electric field.

4. The method of claim 1, further comprising:

computing the image shift in the plane; and determining the applied electric field based on the image shift.

5. An optical component for use in an imaging device for shifting an image formed on a plane of the imaging device, the optical component having an optical axis at least partially determining a location of the formed image in the imaging device, said optical component comprising:

a compartment having:
a first side and an opposing second side;
a substrate on the first side;
a deformable lens comprising a droplet of a first liquid having a first refractive index disposed along the optical axis on the substrate; and
a second liquid disposed in contact with the droplet, the second liquid having a second refractive index different from the first refractive index;

a first electrode layer disposed adjacent the first side of the compartment; and a second electrode layer, disposed in a cooperative relation with the first electrode layer, for providing an electric field on the deformable lens when a voltage is applied to at least the first electrode layer, wherein the first electrode layer is effectively divided into a plurality of electrode areas to receive the voltage so that the electric field on the deformable lens can cause a change in the optical axis.

6. The optical component of claim 5, wherein the second electrode layer is disposed adjacent to the second side of the compartment.

7. An imaging device having an optical axis and an image plane for forming an image on the image plane at a location at least partially determined by the optical axis, said imaging device comprising:

a voltage source; and an optical compartment having:
a first side and an opposing second side;
a substrate on the first side;
a deformable lens comprising a droplet of a first liquid having a first refractive index disposed along the optical axis on the substrate; and
a second liquid disposed in contact with the droplet, the second liquid having a second refractive index different from the first refractive index;

a first electrode layer disposed adjacent to the first side of the compartment, the first electrode layer operatively connected to the voltage source; and a second electrode layer, disposed in a cooperative relation with the first electrode layer, for providing an electric field on the deformable lens when a voltage is applied to at least the first electrode layer, wherein the first electrode layer is effectively divided into a plurality of electrode areas to receive the voltage so that the electric field on the deformable lens can cause a change in the optical axis.

8. The imaging device of claim 7, wherein the second electrode layer is disposed adjacent to the second side of the optical compartment.

9. A portable device comprising:

a voltage source;

an imaging sensor array; and an image forming module having an optical axis and an image plane substantially on the imaging sensor array for forming an image on the imaging sensor array at a location at least partially determined by the optical axis, said image forming module comprising:

an optical component comprising:
a first electrode layer operatively connected to the voltage source;
a deformable lens disposed along the optical axis adjacent to the first electrode layer; and
a second electrode layer, disposed in a cooperative relation with the first electrode layer, for applying an electric field on the deformable lens, wherein the first electrode layer is effectively divided into a plurality of electrode areas so that the electric field applied on the deformable lens can cause a change in the optical axis.

10. The portable device of claim 9, further comprising:

an image processor, operatively connected to the imaging sensor array for receiving signals indicative of the image formed on the imaging sensor array, for determining a shift of the image location due to movement of the portable device, wherein the image processor is also operatively connected to the voltage source for providing a signal indicative of the image shifting to the voltage source so as to allow the voltage source to adjust the electric field such that the optical axis is changed to compensate for the image shifting due to the movement.

11. The portable device of claim 10, wherein the image processor comprises a software program for computing voltage levels on the electrode areas so as to allow the voltage source to adjust the electric field based on the voltage levels.

12. The portable device of claim 11, wherein the software program comprises a code for determining a shift of the image location based on the signals received from the imaging sensor array.

13. The portable device of claim 9, comprising a mobile terminal.

14. The portable device of claim 9, wherein the deformable lens comprises a droplet of a first liquid having a first refractive index, and wherein the optical component further comprises an optical compartment, the compartment having:

a first side and an opposing second side, the first side adjacent to the first electrode layer;

a substrate on the first side for disposing the deformable lens; and a second liquid disposed in contact with the droplet, the second liquid having a second refractive index different from the first refractive index.

15. The portable device of claim 14, wherein the second layer is disposed adjacent to the second side of the optical compartment.

16. A software product for use in an imaging device, the imaging device having an optical axis and an image plane for forming an image on the image plane at a location at least partially determined by the optical axis, the imaging device comprising:

a voltage source; and an optical component comprising:

a first electrode layer operatively connected to the voltage source;

a deformable lens disposed along the optical axis adjacent to the first electrode layer; and a second electrode layer, disposed in a cooperative relation with the first electrode layer, for applying an electric field on the deformable lens, wherein the first electrode layer is effectively divided into a plurality of electrode areas so that the electric field applied on the deformable lens can cause a change in the optical axis, said software product comprising:

a code for determining a motion-induced image shift on the image plane; and a code for determining a plurality of voltage levels based on the image shift for providing a signal indicative of the voltage levels to the voltage source so as to allow the voltage source to provide the voltage levels to the plurality of electrode areas for causing the change in the optical axis in order to compensate for the motion-induced image shift.

* * * * *